2,987,417
PIGMENTING ALUMINUM OXIDE COATING

William C. Cochran, New Kensington, Pa., assignor to Aluminum Company of America, Pittsburgh, Pa., a corporation of Pennsylvania
No Drawing. Filed June 23, 1958, Ser. No. 743,966
9 Claims. (Cl. 117—69)

This invention relates to the treatment of aluminum surfaces to produce thereon colored coatings, more particularly green colored oxide coatings of decorative value and of light fast nature. As used herein, the word "aluminum" includes pure aluminum, commercial aluminum containing the usual impurities and aluminum base alloys.

The invention particularly relates to a method of pigmenting oxide coatings on aluminum articles with chromic oxide precipitated from a solution of certain hydrolyzable chromic salts. The chromic oxide imparts to the oxide coating a green shade characteristic of this pigment which possesses excellent light-fastness, brilliance and resistance to weathering and temperature changes to which it may be exposed in decorative or architectural applications whether indoors or outdoors.

The formation of various mineral pigments within the pores of oxide coating on aluminum by multi-step processes is well known in the art. Although some of these processes permit the green pigmenting of aluminum oxide coatings, wide spread commercial acceptance of such processes has not yet been attained. For example, a light green color may be imparted to the oxide film by the formation of copper arsenite in the pores of the oxide by a two step process. However, it has been found relatively difficult and impractical to form a sufficient amount of this pigment in the oxide coating so that a desirable, decorative green color is produced. Also an olive green color may be imparted to an oxide coating on aluminum by the formation of lead dichromate in the pores of the oxide coating by a three-step process. In this instance, however, the color produced is a yellow-olive shade which is not a desirable shade of green for most decorative applications.

The known mineral pigment coloring processes for oxide coated aluminum generally involved at least a two step operation. The initial step is that of impregnating the oxide coating with a reagent capable of being converted to an insoluble coloring pigment. In a subsequent operation, the pigment is formed in the pores of the adsorbent oxide layer as by a metathetical or other chemical reaction. For example, one previously proposed method for coloring an aluminum oxide coating with a green pigment involved adsorbing hexavalent chromium in the oxide coating, and in a separate operation, reducing the chromium in place. Another proposed method involved adsorbing in the coating a non-aqueous liquid chromium reagent and, in a subsequent operation, hydrolyzing the reagent to leave a green pigment in the pores of the oxide coating. In such methods, rinsing operations are generally required, after both the first and second steps. This removes an indeterminate amount of the reagent deposited in the oxide coating, which amount may vary with each aluminum panel. As a result, a noticeable variation in color occurs. A further disadvantage with any multi-step operation is that each additional step adds materially to the cost of operation.

The present invention has for its general object the effective pigmentation of oxide coatings on aluminum with a green chromic oxide pigment in a single operation. By the method of this invention, a green coating suitable for architectural or decorative applications, indoors or outdoors, may be produced. The color is characterized by resistance to fading on exposure to light, and pronounced resistance to weathering. Furthermore, a large number of oxide coated aluminum articles can be colored in a given solution without substantial variation in the color produced.

In practicing my invention, the aluminum or aluminum alloy which is to be colored is first provided with an adsorbent oxide coating, the coating is advantageously treated with nitric acid and rinsed with water, the coating is colored by immersion in a solution of certain chromic salts, and the colored coating is preferably sealed, the following simplified flow-diagram illustrating the preferred order of steps:

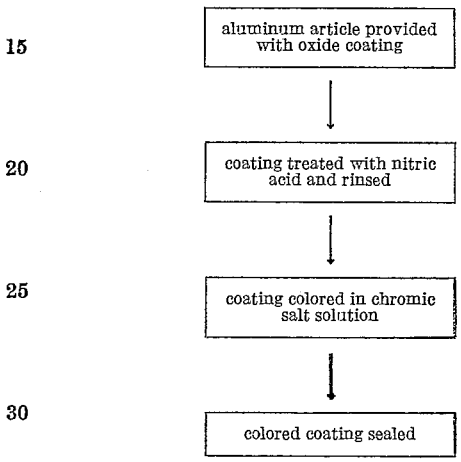

The oxide coating may be formed by any of several known methods producing coatings of sufficient thickness to provide adequate adsorptive capacity for retaining the coloring pigment. For example, the oxide coating may be produced chemically by treating the aluminum surface with a solution of an alkaline carbonate usually a sodium carbonate-chromate solution. This coating may be rendered more adsorptive by immersing the coated article in a hot aqueous solution containing an ammonium salt such as ammonium chloride as described in U.S. Patent 2,496,649 to Zelley. In another method, the coating may be produced by the anodic oxidation of the aluminum surface in an acid solution such as a sulfuric acid solution, a chromic acid solution or an oxalic acid solution. However, the color produced with oxalic acid anodic coatings is not as attractive as that obtained with the other acid coatings. In all cases the oxide coating to which this invention relates is produced by artificial means, and the expression "oxide coating" is not intended to include natural oxide films occurring on aluminum surfaces exposed to the atmosphere.

The present invention is particularly applicable to anodic oxide coatings, and more particularly to those produced in electrolytes containing sulfuric acid or chromic acid. Therefore the invention will be described in most detail in connection with coatings of this type.

I have found that I can impart a decorative green shade to an oxide coating by depositing within the pores of the adsorbent oxide layer a chromic oxide pigment in a single operation. The depth of color depends, of course, upon the adsorption characteristics and thickness of coating. The coating may be impregnated with the coloring pigment by immersing the coated article in an aqueous solution containing at least one of certain hydrolyzable chromic salts. This result is obtained with an aqueous solution of at least one chromic salt from the group consisting of chromic bisulfite, chromic oxalate and chromic formate, which group is characterized by having chromium present in trivalent form. An attractive green shade may be imparted to the anodically oxidized aluminum by a single immersion for a relatively short time in a hot solution of one or more of the above-named chromic salts. The green color is formed in the anodic coating by hydrolysis of the chromic salt to produce chromic oxide, probably best represented by the formula $Cr_2O_3 \cdot XH_2O$, which is precipitated and adsorbed in the pores of the coating.

Solutions of other chromic compounds either do not appear to hydrolyze, or hydrolyze much too slowly, to precipitate pigmenting amounts of chromic oxide out of solution. Still other chromic salt solutions may hydrolyze too rapidly, and satisfactory coloring of oxide coatings is not obtained by their use. Aqueous solutions of such common inorganic chromium compounds as chromic chloride, chromic nitrate, chromic sulfate and chromic potassium sulfate will impart only a slight green tone to the oxide layer, and similar limited coloring effects have been observed with such organic chromium compounds as chromic acetate and chromic tartrate. The solutions of chromic compounds employed in the practice of this invention, however, impart attractive, decorative colors.

The concentration of chromic ions in the hot pigmenting solution preferably should be from about 5 grams to 30 grams per liter. Solutions of a higher concentration do not appear to give a deeper shade of green, whereas a lower concentration results in a decrease in the "coloring power." A deeper more attractive shade of green may be produced when the pigmenting solution is maintained at a temperature above about 150° F., and preferably kept near boiling. The time required for immersion is substantially less when employing a pigmenting solution at or near its boiling point. A single immersion in the boiling solution for about ¼ minute to 20 minutes, preferably about 4 to 10 minutes, will produce the desired green color. Lower temperatures require slightly longer immersions. For example, with a coloring solution at a temperature of about 150° F., it is generally desirable to immerse the oxide coated panel for about 10 to 45 minutes, preferably 20 to 30 minutes. Prolonged immersions in the hot solutions do not appear to produce deeper colors, and may produce an undesirable smudge on the oxide layer. However, long immersions in solutions of high concentration are effective at even lower temperatures. Also, a thicker oxide coating, being more adsorbent, will produce a deeper shade of green than a thin coating under the same circumstances. Thus it can be readily understood by one skilled in the art that a wide range of shades from light pastel green to dark forest green may be produced by the proper choice of chromic salt and adjustment of concentration of the chromic ion, time of immersion, temperature of the bath, and thickness of the anodic coating to be treated.

It is a common practice to seal the oxide coating on aluminum, as by immersing the aluminum article in boiling water, to prevent staining or undesired coloring of the coating. Consequently, employing pigmenting solutions at elevated temperatures has the further advantage of sealing the anodic coating simultaneously with coloring. However, in certain instances the boiling water treatment may not be completely effective. In such cases, I have found that a five minute seal in a boiling nickel acetate solution having a concentration from about 1 to 5 grams per liter insures complete sealing of the green colored anodic coating.

It has been found that generally the coloring bath is more stable and produces a more satisfactory green colored anodic coating when the hydrogen ion concentration range is from about pH 3.5 to pH 7.5, and more preferably in the range from about pH 4 to pH 5. Generally, anodic coatings pigmented in more acidic solutions are attacked by the solution as evidenced by the formation of a heavy smudge on the oxide layer. On the other hand, when the pH of the solution is raised substantially above about 6, there is an excessive formation of hydrous chromic oxide precipitate in the solution and the solution begins to lose effectiveness. The hydrogen ion concentration of the chromic salt solutions may be adjusted by the addition of a suitable base or acid.

In pigmenting with a chromic salt solution, particularly those other than chromic bisulfite, it is of further advantage to provide for the addition of a soluble alkali metal sulfite which expression is intended to include ammonium sulfite. By soluble alkali metal sulfite, I mean in this specification and the claims appended hereto, a sulfite or a bisulfite or mixtures of these compounds. Incorporating about 5 to 30 grams per liter of sulfite ion in the pigmenting solution renders the color slightly deeper, and a more brilliant shade of green is obtained than when no sulfite ion is present. Also, the sulfite ion appears to reduce attack by the solution on the anodic coating.

It has been found particularly advantageous to treat the anodic coating with nitric acid prior to the pigmenting operation. The oxide coated aluminum panel is immersed for about 5 to 10 minutes in a 50% nitric acid solution at room temperature, and subsequently rinsed with water. This treatment aids in producing a deeper, more brilliant shade of green in the oxide coating.

Suitable aqueous solutions containing chromic bisulfite may be obtained by reacting a chromic potassium sulfate (chromic alum) or chromic sulfate solution with a bisulfite. A reaction may be illustrated as follows:

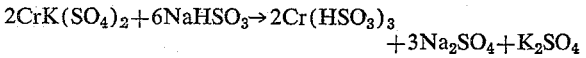
$$2CrK(SO_4)_2 + 6NaHSO_3 \rightarrow 2Cr(HSO_3)_3 + 3Na_2SO_4 + K_2SO_4$$

Equally as good results are obtainable with chromic bisulfite solutions prepared from chromic nitrate or chromic chloride. Similarly, chromic formate coloring solutions may be prepared by reacting together sodium formate and chromic potassium sulfate, for example.

Pigmenting solutions of chromic oxalate may be obtained by dissolving the proper amount of the salt in water, or by dissolving appropriate amounts of chromium trioxide and oxalic acid together in water and allowing them to react so that all of the hexavalent chromium is reduced to the trivalent form. The following equation illustrates the reaction:

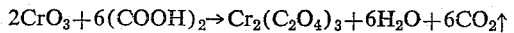
$$2CrO_3 + 6(COOH)_2 \rightarrow Cr_2(C_2O_4)_3 + 6H_2O + 6CO_2\uparrow$$

A small percentage of hexavalent chromium present in the chromic oxalate coloring solution will produce an undesirable yellow-green cast to the oxide coating. Consequently, a slight excess of oxalic acid is desired to insure complete reduction of all hexavalent chromium.

The following examples will further illustrate the practice of my invention:

Example 1

An aluminum panel was etched for one minute in a 5% sodium hydroxide solution at 150° F. The panel was then anodically coated in a 15% sulfuric acid electrolyte for 67 minutes with a current density of 12 amperes per square foot and at an electrolyte temperature of 80° F. The anodized panel was rinsed with water and immersed in a 50% nitric acid solution for 5 minutes at room temperature. The panel was removed from the bath, and again rinsed with water. The anodically coated panel was immersed in a chromic bisulfite pigmenting solution prepared by dissolving 88 grams of potassium chromium sulfate, $CrK(SO_4)_2 \cdot 12H_2O$, and 50 grams of sodium metabisulfite, $Na_2S_2O_5$, in one liter of water. The pH of the resulting solution was adjusted to a value of between 4 and 5 by means of the addition of sodium hydroxide. The panel was immersed in the coloring solution for 4 minutes at a temperature of 195° F. An attractive light green color was formed on the oxide coating.

Example 2

An aluminum panel was etched, anodically coated and treated with nitric acid solution in a manner similar to that described in Example 1. A chromic oxalate pigmenting solution was made by dissolving 25 grams of chromic oxalate together with 7 grams of oxalic acid in one liter of water, and the anodized panel was immersed in this solution for 10 minutes at a temperature of 212° F. The pH of the solution was maintained at 4.1 by the addition of a sufficient amount of ammonium hydroxide when necessary. In other tests 20 grams of ammonium sulfite were added to this chromic oxalate solution, and the pH adjusted to 5.5. A light green color was produced on the coating in each case.

Example 3

An aluminum alloy panel was prepared in a manner similar to that described in Example 1. A chromatic oxalate pigmenting solution was prepared by carefully adding 56.4 grams of oxalic acid to 13.6 grams of chromium trioxide ($CrO_3$) in one liter of water. The solution was brought to boiling, the pH adjusted to 5.8, and the anodic oxide panel was immersed in the solution for 10 minutes. A pale green shade was imparted to the coating.

Example 4

An etched aluminum panel as described in Example 1 was anodically coated in a 15% sulfuric acid electrolyte for 135 minutes with a current density of 12 amperes per square foot and at an electrolyte temperature of 70° F. The panel was treated with nitric acid. A chromic formate pigmenting solution was made by dissolving 120 grams of chromium potassium sulfate and 50 grams of sodium formate in one liter of water, and the anodized panel was immersed in this solution for 10 minutes at 210° F. The pH of the solution was maintained at 4.5 by the addition of sodium hydroxide. A dark green color was produced on the coating.

Example 5

An aluminum panel, etched in sodium hydroxide, was anodically coated for 32 minutes in an electrolyte of 130 grams per liter of chromic acid ($CrO_3$). The electrolyte temperature was 130–132° F., and the voltage was 24. The anodically coated specimen was rinsed, and immersed in a chromic oxalate coloring solution having a concentration of 25 grams per liter for 10 minutes at 195 to 200° F. The pH of the solution was 4.3. The anodic coating was colored a medium green shade.

Numerous other conditions of operation, of course, may be employed, as described hereinabove.

I claim:

1. The method of pigmenting an aluminum article having on its surface an artificially produced oxide coating, comprising immersing the coated article in an aqueous solution containing at least one chromic salt from the group consisting of chromic bisulfite, chromic oxalate and chromic formate, whereby said oxide coating is impregnated and colored with chromic oxide pigment precipitated from said solution.

2. The method of pigmenting an aluminum article having on its surface an artificially produced oxide coating, comprising immersing the coated article in an aqueous solution containing at least one chromic salt from the group consisting of chromic bisulfite, chromic oxalate and chromic formate, the solution being maintained at a temperature above about 150° F. and the immersion being for a period of about ¼ minute to 45 minutes, whereby said oxide coating is impregnated and colored with chromic oxide pigment precipitated from said solution.

3. The method of pigmenting an aluminum article having on its surface an artificially produced oxide coating, comprising immersing the coated article in a hot aqueous solution containing at least one chromic salt from the group consisting of chromic bisulfite, chromic oxalate and chromic formate, the solution containing about 5 to 30 grams per liter of trivalent chromium ion and the immersion being for a period of about ¼ minute to 45 minutes, whereby said oxide coating is impregnated and colored with chromic oxide pigment precipitated from said solution.

4. The method of pigmenting an aluminum article having on its surface an artificially produced oxide coating, comprising immersing the coated article in a hot aqueous solution containing at least one chromic salt from the group consisting of chromic bisulfite, chromic oxalate and chromic formate, the solution containing about 5 to 30 grams per liter of trivalent chromium ion, being maintained at a temperature above about 150° F. and having a pH of about 3.5 to 7.5; whereby said oxide coating is impregnated and colored with chromic oxide pigment precipitated from said solution.

5. The method of pigmenting an aluminum article having on its surface an artificially produced oxide coating, comprising immersing the coated article in a hot aqueous solution of chromic bisulfite, whereby said oxide coating is impregnated and colored with chromic oxide pigment precipitated from said solution.

6. The method of pigmenting an aluminum article having on its surface an artificially produced oxide coating, comprising immersing the coated article in a hot aqueous solution of chromic oxalate, whereby said oxide coating is impregnated and colored with chromic oxide pigment precipitated from said solution.

7. The method of pigmenting an aluminum article having on its surface an artificially produced oxide coating, comprising immersing the coated article in a hot aqueous solution of chromic formate, whereby said oxide coating is impregnated and colored with chromic oxide pigment precipitated from the solution.

8. The method of pigmenting an aluminum article having on its surface an artificially produced oxide coating, comprising immersing the coated article in a hot aqueous solution containing a soluble alkali metal sulfite and at least one chromic salt from the group consisting of chromic bisulfite, chromic oxalate and chromic formate, whereby said oxide coating is impregnated and colored with chromic oxide pigment precipitated from the solution.

9. The method according to claim 8 in which the concentrations of the sulfite ion and of the chromic ion are each about 5 to 30 grams per liter.

References Cited in the file of this patent

UNITED STATES PATENTS

| | | |
|---|---|---|
| 2,008,733 | Tosterud | July 23, 1935 |
| 2,018,388 | Tosterud | Oct. 22, 1935 |
| 2,203,670 | Buzzard | June 11, 1940 |
| 2,930,106 | Wrotnowski | Mar. 29, 1960 |